(12) United States Patent
Shattil

(10) Patent No.: US 7,787,514 B2
(45) Date of Patent: Aug. 31, 2010

(54) CARRIER INTERFEROMETRY CODING WITH APPLICATIONS TO CELLULAR AND LOCAL AREA NETWORKS

(75) Inventor: Steve Shattil, Boulder, CO (US)

(73) Assignee: Lot 41 Acquisition Foundation, LLC, Wilmington, DE (US)

( * ) Notice: Subject to any disclaimer, the term of this patent is extended or adjusted under 35 U.S.C. 154(b) by 1704 days.

(21) Appl. No.: 10/697,534

(22) Filed: Oct. 30, 2003

(65) Prior Publication Data

US 2004/0100897 A1 May 27, 2004

Related U.S. Application Data

(63) Continuation-in-part of application No. 09/022,950, filed on Feb. 12, 1998, now Pat. No. 5,955,992.

(60) Provisional application No. 60/422,670, filed on Oct. 31, 2002.

(51) Int. Cl.
*H04B 1/707* (2006.01)
(52) U.S. Cl. .......... 375/130; 375/260
(58) Field of Classification Search ........... 375/130, 375/140, 141, 145, 146, 147, 148, 260
See application file for complete search history.

(56) References Cited

U.S. PATENT DOCUMENTS

| | | | |
|---|---|---|---|
| 4,641,317 A | 2/1987 | Fullerton | |
| 4,743,906 A | 5/1988 | Fullerton | |
| 4,813,057 A | 3/1989 | Fullerton | |
| 4,827,480 A | 5/1989 | Kowalski | |
| 4,901,307 A | 2/1990 | Gilhousen et al. | |
| 4,979,186 A | 12/1990 | Fullerton | |
| 5,003,545 A | 3/1991 | Kowalski | |
| 5,117,239 A | 5/1992 | Riza | |
| 5,132,694 A | 7/1992 | Sreenivas | |
| 5,187,487 A | 2/1993 | Riza | |
| 5,202,776 A | 4/1993 | Gesell et al. | |
| 5,231,405 A | 7/1993 | Riza | |
| 5,260,968 A | 11/1993 | Gardner et al. | |
| 5,274,381 A | 12/1993 | Riza | |
| 5,307,073 A | 4/1994 | Riza | |
| 5,329,248 A | 7/1994 | Izadian | |
| 5,333,000 A | 7/1994 | Hietala et al. | |
| 5,363,108 A | 11/1994 | Fullerton | |
| 5,367,305 A | 11/1994 | Volker et al. | |
| 5,432,522 A | 7/1995 | Kurokami | |
| 5,461,687 A | 10/1995 | Brock | |
| 5,471,647 A | 11/1995 | Gerlach et al. | |

(Continued)

OTHER PUBLICATIONS

Wiegandt et al, "Overcoming peak-to-peak average power ratio issues in OFDM via carrier-interferometry codes," 2001, IEEE, vol. 2, pp. 453-456.*

(Continued)

*Primary Examiner*—Kevin Y Kim
(74) *Attorney, Agent, or Firm*—Connolly Bove Lodge & Hutz LLP

(57) ABSTRACT

An adaptation to Carrier Interferometry synthesis and analysis provides for frequency-varying subcarriers. Coding and decoding functionality can be extended to orthogonal chirped and frequency-hopped waveforms. Poly-amplitude codes permit successive interference cancellation in spatial and frequency-domain processing. Dynamic re-sectorization and bandwidth exchange are facilitated by subcarrier allocation.

14 Claims, 11 Drawing Sheets

U.S. PATENT DOCUMENTS

| | | | |
|---|---|---|---|
| 5,512,907 | A | 4/1996 | Riza |
| 5,515,060 | A | 5/1996 | Hussain et al. |
| 5,515,378 | A | 5/1996 | Roy, III et al. |
| 5,583,516 | A | 12/1996 | Lembo |
| 5,592,490 | A | 1/1997 | Barratt et al. |
| 5,623,360 | A | 4/1997 | Gesell et al. |
| 5,642,353 | A | 6/1997 | Roy, III et al. |
| 5,677,697 | A | 10/1997 | Lee et al. |
| 5,687,169 | A | 11/1997 | Fullerton |
| 6,359,923 | B1 * | 3/2002 | Agee et al. ............... 375/130 |
| 6,504,862 | B1 | 1/2003 | Yang |
| 6,526,105 | B1 | 2/2003 | Harikumar et al. |
| 6,549,566 | B1 * | 4/2003 | Lee et al. ............... 375/219 |
| 6,687,511 | B2 | 2/2004 | McGowan et al. |
| 6,801,580 | B2 * | 10/2004 | Kadous ............... 375/267 |
| 6,859,506 | B1 | 2/2005 | McCorkle |
| 7,031,371 | B1 | 4/2006 | Lakkis |
| 7,082,153 | B2 | 7/2006 | Balachandran et al. |
| 2002/0159425 | A1 * | 10/2002 | Uesugi et al. ............... 370/342 |
| 2003/0064690 | A1 * | 4/2003 | Kasapi ............... 455/101 |
| 2004/0057501 | A1 | 3/2004 | Balachandran et al. |

OTHER PUBLICATIONS

Wiegandt det al, "Overcoming peak-to-peak avearge power ratio issues in OFDM via carrier-interferometry codes," 2001, IEEE, vol. 2, pp. 660-663.*

Jevremovic, "Smart Antenna Systems for CDMA (IS-95) Technology"; Microwave Online Servcies Co., US West Advanced Technologies white paper, Feb. 1998.

Kowalski, Hale, Shattile, "Broadband Continuous-Wave Laser," Optics Letters, vol. 13, No. 8, Aug. 1988, pp. 622-624.

Kowalski, Shattil, Hale, "Optical Pulse Generation with a Frequency Shifted Feedback Laser," Appl. Phys. Lett., vol. 53, No. 9, Aug. 29, 1988.

Kowalski, Squier, Pinckney, "Pulse Generation with an Acouslo-Optic Frequency Shifter in a Passive Cavity," Appl. Phys. Lett., vol. 50, No. 12, Mar. 23, 1987.

Shattil, "A New Method for Generating Short Optical Pulses," T-3513, Colorado School of Mines, Dec. 1987.

Natarajan, "Throughput enhancement in TDMA through carrier interferometry pulse shaping," 52nd Vehicular Technology Conference, 2000, IEEE VTS-Fall VTC 2000, vol. 4, Sep. 24-28, 2000, pp. 1799-1803, vol. 4.

Wiegandt, "Peak-to-average power reduction in high-performance, high-throughput OFDM via pseudo-orthogonal carrier-interferometry coding," IEEE Pacific Rim Conference on Communications, Computers and signal Processing, 2001, PACRIM, 2001, vol. 2, Aug. 26-28, 2001 pp. 453-456, vol. 2.

Natarajan, "Innovative pulse shaping for high-performance wireless TDMA," IEEE Communications Letters, vol. 5, Issue 9, Sep. 2001, pp. 372-374.

Zhiqiang, "Ultra wideband DS-CDMA via innovations in chip shaping," IEEE VTS 54th Vehicular Technology Conference, 2001, VTC 2001, Fall., vol. 4, Oct. 7-11, 2001, pp. 2470-2474, vol. 4.

Natarajan, "Crest factor considerations in MC-CDMA with carrier interferometry codes," PACRIM, 2001 IEEE Communications Pacific Rim Conference on Computers and signal Processing, 2001, vol. 2, Aug. 26-28, 2001, pp. 445-448, vol. 2.

Wiegandt, "Overcoming peak-to-average power ratio issues in OFDM via carrier-interferometry codes," IEEE VTS 54th Vehicular Technology Conference, 2001, VTC 2001 Fall, vol. 2, Oct. 7-11, 2001, pp. 660-663, vol. 2.

* cited by examiner

|  | $s_0()$ | $s_1()$ ⟋201 | 0 | $s_{N-1}()$ |
|---|---|---|---|---|
| $w_1 = \Sigma():$ | $e^{i2\pi(0)(0)/(N)}$ | $e^{i2\pi(1)(0)/(N)}$ | ......$e^{i2\pi(2)(0)/(N)}$ | ......$e^{i2\pi(N-1)(0)/(N)}$ |
| $w_2 = \Sigma():$ | $e^{i2\pi(0)(1)/(N)}$ | $e^{i2\pi(1)(1)/(N)}$ | ......$e^{i2\pi(2)(1)/(N)}$ | ......$e^{i2\pi(N-1)(1)/(N)}$ |
| $w_3 = \Sigma():$ | $e^{i2\pi(0)(2)/(N)}$ | $e^{i2\pi(1)(2)/(N)}$ | ......$e^{i2\pi(2)(2)/(N)}$ | ...⟍$e^{i2\pi(N-1)(2)/(N)}$  ⟋203 |
| ⋮ | ⋮ | ⋮ | ⋮ | ⋮ |
| $w_N = \Sigma():$ | $e^{i2\pi(0)(N-1)/(N)}$ | $e^{i2\pi(1)(N-1)/(N)}$ | ......$e^{i2\pi(2)(N-1)/(N)}$ | ......$e^{i2\pi(N-1)(N-1)/(N)}$ |

|  | $s_0()$ | $s_1()$ ⟵401 | $p_m$ | $s_{N-1}()$ |
|---|---|---|---|---|
| $w_1 = \Sigma()$: | $e^{i2\pi(0)(0)/(N)}$ | $e^{i2\pi(1)(0)/(N)}$ | ......... $e^{i2\pi(2)(0)/(N)}$ | ......... $e^{i2\pi(N-1)(0)/(N)}$ |
| $w_2 = \Sigma()$: | $e^{i2\pi(0)(1)/(N)}$ | $e^{i2\pi(1)(1)/(N)}$ | ......... $e^{i2\pi(2)(1)/(N)}$ | ......... $e^{i2\pi(N-1)(1)/(N)}$ |
| $w_3 = \Sigma()$: | $e^{i2\pi(0)(2)/(N)}$ | $e^{i2\pi(1)(2)/(N)}$ | ......... $e^{i2\pi(2)(2)/(N)}$ | ......... $e^{i2\pi(N-1)(2)/(N)}$ —403 |
| ⋮ | ⋮ | ⋮ | ⋮ | ⋮ |
| $w_N = \Sigma()$: | $e^{i2\pi(0)(N-1)/(N)}$ | $e^{i2\pi(1)(N-1)/(N)}$ | ......... $e^{i2\pi(2)(N-1)/(N)}$ | ......... $e^{i2\pi(N-1)(N-1)/(N)}$ |

CARRIER INTERFEROMETRY CODING WITH APPLICATIONS TO CELLULAR AND LOCAL AREA NETWORKS

RELATED APPLICATIONS

This application is a Continuation In Part of U.S. patent application Ser. No. 09/022,950 filed on Feb. 12, 1998, which is now U.S. Pat. No. 5,955,992. This application also claims priority to Provisional Application 60/422,670 filed on Oct. 31, 2002.

BACKGROUND OF THE INVENTION

I. Field of the Invention

The present invention relates to multicarrier spread spectrum communications.

II. Description of the Related Art

OFDM has a high spectral efficiency (the spectrum of the subcarriers overlap) and combats frequency-selective fading. However, the amplitude of each carrier is affected by the Rayleigh law, hence flat fading occurs. Even with good channel estimation and channel coding, fading and interference can easily compromise the performance of OFDM.

Multi-carrier CDMA (MC-CDMA) applies CDMA spreading codes to orthogonal subcarriers to enhance frequency-diversity benefits. However, MC-CDMA, like OFDM, suffers from a high peak-to-average-power ratio (PAPR). The high PAPR of conventional multi-carrier signals imposes significant constraints on the transmission circuitry and significantly increases power consumption.

Carrier Interferometry (CI) is a multi-carrier technology invented by Applicant and described in over 70 technical journals and conference proceedings, as well as in two textbooks. As a multicarrier transmission protocol, CI provides unsurpassed performance and versatility compared to all other technologies.

There is a need in the art to employ frequency-diversity advantages on the sub-carrier level of a multicarrier signal. Also, there are acknowledged needs in the art for improved transmission security, enhanced channel coding, and dynamic-range reduction in multicarrier transmissions. Such needs are addressed by the present invention.

SUMMARY OF THE INVENTION

The needs in the art are addressed by the apparatus and methods of the present invention. One aspect of the invention employs frequency-varying (e.g., chirped) subcarriers in combination with CI coding, which provides various advantages, including spreading, PAPR reduction, and channel coding enhancements. The transmitter may employ an inverse Fourier transform (or some other invertible N-point transform) with time-dependent (e.g., varying) weights. Examples of inverse transforms that may be used include chirped Z transforms and sliding transforms (e.g., sliding FFTs and IFFTs). On the receiver side, a complementary transform is provided. Receiver-side processing may include Rake reception.

The process of generating the transform weights may provide for channel coding. In one aspect of the invention, low-density parity check codes are implemented within a CI transform. On the receiver side, corresponding decoding processes (which may include combinations of soft decision and hard decision processing) are employed.

Subcarrier weights may be allocated relative to any combination of network operating parameters and operational specifications. Optimizing bandwidth efficiency and mitigating co-channel interference are important considerations. Sub-carrier allocation schemes are developed for dynamic bandwidth allocation, spectrum sharing, and optimizing communication efficiency in a cellular configuration.

The invention leverages known prior-art multicarrier technologies and disclosures of CI technology, such as C. R. Nassar, B. Natarajan, Z. Wu, D. Wiegand, S. A. Zekavat, and S. Shattil, *Multi-Carrier Technologies for Wireless Communication*, Kluwer Academic Publishers, Norwell, Mass., December 2001, which is hereby incorporated by reference in its entirety.

Some of the many wireless applications of the invention include local-area networks, cellular communications, personal communication systems, broadband wireless services, data link, voice radio, satellite links, tagging and identification, wireless optical links, campus-area communications, wide-area networks, last-mile communication links, and broadcast systems. The invention may be used in non-wireless communication systems, such as guided wave, cable, wire, twisted pair, and/or optical fiber. Other applications and embodiments of the invention are apparent from the description of preferred embodiments and the claims that follow.

DESCRIPTION OF THE PREFERRED EMBODIMENTS

Various types and aspects of channel coding may be integrated into CI coding. Channel coding achieves its effectiveness from spreading (i.e., distributing energy corresponding to each information symbol over multiple transmitted symbols) and redundancy (i.e., increasing the transmitted power per information symbol). Spreading in OFDM channel coding is related to the constraint length in convolutional coding and the block (or code) length in block coding. In convolutional coding, spreading can be achieved by mapping each data symbol into a code symbol that has a memory of a predetermined number of earlier information symbols. In the case of block codes, spreading is achieved by mapping information symbols into code sets that require more bandwidth or time for transmission than is required by the uncoded information. Spreading may take the form of including parity check symbols, or any other type of information about individual information symbols or combinations of information symbols. Redundancy may involve repeating information symbols or mapped information symbols. Redundancy also can involve mapping a predetermined number of information symbols to a larger number of transmission symbols. For example, block codes, convolutional codes, and parity-check codes can provide information redundancy.

Coded symbols are typically mapped into at least one diversity-parameter space. For example, coded symbols may be mapped onto different carriers, such as in CI and OFDM. Coded symbols may be mapped into different time intervals (e.g., time-domain pulse waveforms), such as in TDMA and DS-CDMA. Coded symbols may also be used as space-time codes, polarization codes, or they may be used in any other form of sub-space coding. In particular, information-modulated coded symbols may be transmitted over unique frequency/sub-space combinations.

Methods and systems used to generate CI codes in the present invention are similar to the methods and systems described and illustrated in patent application 60/259,433 (filed Dec. 30, 2000), Ser. No. 10/131,163 (filed on Apr. 24, 2002), Ser. No. 10/145,854 (filed on May 14, 2002), Ser. No. 09/718,851 (filed on Nov. 22, 2000), and PCT/US01/50856 (filed on Dec. 26, 2001), which are incorporated by reference.

Figure 1:
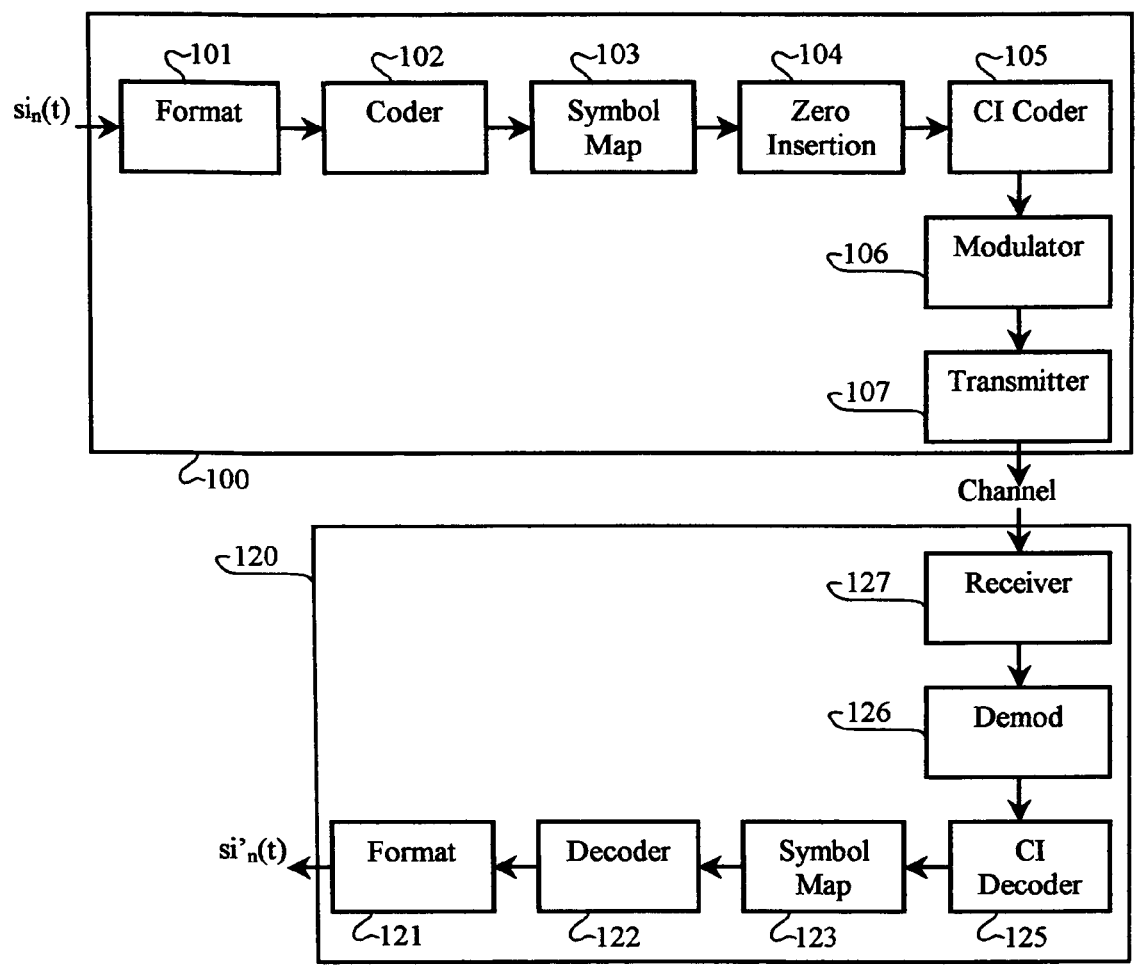
FIG. 1 illustrates method and apparatus embodiments of a transmitter and a receiver of the invention.

FIG. 1 illustrates a transmitter 100 and a receiver 120 of the invention. The transmitter 100 accepts at least one information signal $si_n(t)$ that is optionally formatted 101 (such as described in B. Sklar, *Digital Communications*, P T R Prentice Hall, Upper Saddle River, N.J., which is incorporated by reference). The other transceiver components shown in FIG. 1 and the functions of those components are also described in Sklar. Transceiver components described in Sklar and not shown in FIG. 1 may be included in variations of the invention. The resulting digital signal is optionally channel coded 102 via any form of channel coding (including CI coding). An optional symbol mapping module 103 is adapted to map the resulting digital signal into transmit symbol values to be transmitted. The transmit symbol values are sometimes referred to as modulation symbols. For example, the symbols may include a constellation of $2^l$ values, where l represents some integer number. The symbols may include real and/or complex symbols.

A predetermined number K of the symbols is mapped to a predetermined number N of CI symbol values in a CI code module 105. If N>K, then the symbols may optionally be provided with zero values, such as may be provided by a zero-insertion module 104. Alternatively, the zero-insertion module 104 may be adapted to provide for windowing, coding, or insertion of parity check values, such as to generate a number N of CI code symbols for each set of K input symbols. Module 104 may be adapted to provide for frequency-domain channelization, spectrum shaping, and/or frequency division multiple access. The CI code module 105 maps the input data symbols to the CI symbol values. The CI code module 105 may include an inverse Fourier transform module, such as an IFFT, an IDFT, or an IOFFT.

The CI code module 105 may be adapted to provide or adjust sub-carrier weights, such as for spectrum management, security, and/or to reduce the dynamic range of the multicarrier waveform. For example, providing a predetermined vector of phase offsets (e.g., interleaved, scrambled, or coded phase offsets) to the CI sub-carriers can scramble the superposition of the subcarriers. Instead of a well-defined sequence of pulse waveforms, the information is mapped to overlapping (i.e., interfering) waveform superpositions, which can then be descrambled by a CI decoder at a receiver having the corresponding descrambling code. Scrambling can also be useful for reducing the peak-to-average-power ratio (PAPR) of a multicarrier signal employing quadrature amplitude modulation. Scrambling codes may be optimized and/or adapted to minimize PAPR.

A modulator 106 is adapted to modulate the CI symbols onto a plurality of carriers, a plurality of time intervals, a plurality of sub-space channels, or any other diversity-parameter space or combination of diversity parameter spaces. In the case where the modulator impresses the CI symbols onto different carrier frequencies or sub-space channels, a guard interval or cyclic prefix may be appended to each set of symbols to be transmitted in each symbol interval, as is typically performed in conventional multicarrier transmission protocols. The modulator 106 is adapted to perform at least one of a set of all possible modulation types, including phase modulation, amplitude modulation, frequency modulation, polarization modulation, time-offset modulation, beam-pattern modulation, etc. The modulator 106 may provide analog or digital modulation. The modulator 106 may perform PSK modulation, ASK modulation, PAM, QAM, CPM, and/or FSK modulation. The modulator 106 may be adapted to perform either or both analog and digital processing.

A transmitter 107 provides the necessary signal processing operations required to couple the modulated signals into a communication channel. The transmitter 107 may be adapted to perform any type of signal processing performed by communication-system transmitters, including amplification, filtering, frequency conversion, impedance matching, digital-to-analog conversion, and beam forming.

A receiver module 127 includes any receiver components typically adapted to couple a received signal from a communication channel, and adapt the signal for demodulation, as well as other signal processing operations that may be performed in the receiver 120. The receiver module may be adapted to provide amplification, gain control, filtering, frequency conversion, ADC, as well as any other necessary front-end processes performed in prior-art receivers. A demodulator 126 is adapted to convert at least one received modulated signal into a sequence of coded data symbols. The demodulator 126 or CI decoder 125 may be adapted to remove any guard interval or cyclic prefix, as necessary. A CI decoder 125 decodes the coded symbols into a plurality of received transmit symbol values. The CI decoder 125 may optionally include a Fourier transform module, such as an FFT, a DFT, or an OFFT. A symbol mapping module 123 is adapted to convert the received transmit symbol values into a plurality of data bits. An optional decoder 122 is adapted to decode any channel coded data bits. The resulting data bits are optionally formatted 121 to generate signals $si_n(t)$ that are appropriate for output.

In some embodiments employing iterative or otherwise adaptable demodulation and/or decoding, one or more decoding processes may be combined. Optionally, decoding may be combined with demodulation into a single process. One or more of the demodulator 126, the CI decoder 125, the mapping module 123, and the decoder 122 may include a decision system (not shown), including an iterative feedback decision system, a soft decision system, and/or a hard decision system.

Receivers are typically adapted to synchronize with a received transmission. The receiver of the present invention may be adapted to perform any appropriate type of synchronization. For example, a received signal including at least one preamble may be processed by applying a sliding correlator algorithm to the received signal. The method may include matching at least one stored preamble to the received signal. Acquisition and/or synchronization may be aided by one or more reference tones or pilot signals. A receiver, such as the receivers shown and described herein, may include modules or systems adapted to perform synchronization, such as timing synchronization (e.g., symbol, frame, and/or channel synchronization), phase synchronization, frequency synchronization, polarization synchronization, and/or sub-space synchronization.

The transceiver described with respect to FIG. 1 may be adapted to other aspects of the invention described herein. The CI coder 105 may be adapted to generate windowed CI codes, unequally weighted codes, poly-amplitude codes, poly-phase codes, poly-amplitude/poly-phase codes, hybrid CI codes, chirp codes, frequency-shift codes, etc. Corresponding decoder 125 functionality is preferably provided at the receiver. In some embodiments of the invention, further aspects, adaptations, and variations of the invention, including those described herein may be considered as being incorporated into the transceiver and transceiver methods described with respect to FIG. 1.

In one aspect of the invention, a receiver performs channel estimation for a received symbol block from a transmitter. The transmitter may be adapted to generate known training symbols or pilot signals. The receiver may be adapted to perform channel estimation based on measurements of known symbols and/or estimates of received data values. The channel estimation produces a channel map that takes into account most recent characteristics and conditions of the channel, as exhibited during a data transmission from a transmitting network node to a receiving network node. It may identify one or more transmission parameters, including modulation type, channel-coding parameter(s), and carriers, to be used in a next data transmission from the transmitter to the receiver on that channel. The channel-estimation mechanism attempts to select the highest data rate available and/or the lowest transmission power given the channel conditions. If the requirements of a data rate (e.g., modulation type) in a standard transmission mode cannot be satisfied to ensure reliable data transmission, the mechanism selects a lower data rate, but more robust, transmission mode. Alternatively, a larger number of carriers (i.e., a larger bandwidth) is allocated to the transmission link.

With respect to channel estimation and transmission control, symbols to be transmitted may be mapped into higher-constellation symbols that are transmitted over longer symbol durations. This is referred to herein as constellation/duration processing. For example, as higher constellations are selected to convey data (and thus, increase the number of data bits conveyed by each of the higher-constellation symbols), the symbol duration of each higher-constellation symbol may be increased to compensate for the greater precision required to identify the symbols. Longer symbol durations allow for more samples corresponding to each transmitted symbol to be collected by a digital receiver. Similarly, longer symbol durations allow for improved performance of matched filters or correlators. The cyclic prefix or guard interval used for each symbol imposes less overhead on the transmission bandwidth efficiency when higher modulation schemes are employed. This improvement in bandwidth efficiency is maintained even when the increased symbol duration cancels the bandwidth-efficiency benefits of the payload when higher-order constellations are used.

In one embodiment of the invention, constellations are selected for a predetermined symbol duration. In another embodiment of the invention, the duration of each symbol is selected relative to the symbol constellation and channel conditions. In particular, the symbol duration may be optimized relative to rate-of-change of the channel conditions. Combinations of adaptations to both symbol durations and symbol constellations may be provided with respect to different multicarrier communication formats.

Zero values may be added to an information symbol vector prior to mapping the vector to a coded (e.g., CI coded) symbol vector. When the number of information symbol values in the information symbol vector is less than the length of the vector, the coded symbol vector can provide benefits of spreading. Similarly, if the average power per transmitted symbol (i.e., code symbol) is set constant (e.g., the total transmit power of the coded information with zeroes equals the total transmit power of coded information without zeroes), the benefits of redundancy (e.g., increased energy per information bit) are achieved. The zero values may be appended or prepended to the information symbol vector. Alternatively, the zero values may be interleaved into the information symbol vector. The zero values may also be employed as known values. The zero values may be used as training symbols. In some embodiments of the invention, zero values may be provided as at least a portion of a cyclic prefix or guard interval.

Multicarrier signals are commonly provided with a plurality of pilot tones for synchronization. In this case, PAPR-reduction codes, such as CI codes, or CI carrier weights $w_n$, may be applied to the pilot tones. In particular, CI code symbols may be selected so as to provide a superposition of the pilot tones with a low PAPR. Thus, a set of phase offsets may be provided to the pilot tones to reduce or minimize the PAPR of the carrier superposition. Since CI carrier weights are often poly-amplitude, as well as polyphase, it is desirable to select a plurality of carrier weights having a predetermined minimum magnitude that also adequately reduces PAPR. Techniques for selecting the carrier weights may include selecting a coded pulse train (such as generated by a superposition of tones) having low PAPR. In some applications, it may be permissible to reduce the power of the pilot tones once signal acquisition is achieved. For example, one or more pilot tones may be dropped or decreased in order to lower PAPR.

Superpositions of pilot tones may be mapped to one or more phase spaces (i.e., pulse positions). Accordingly, pilot-tone pulses may be positioned in a pulse train relative to information-bearing pulses (e.g., in vacant pulse positions) to provide a low PAPR. Pulses generated from pilot tones may be positioned within headers, in preambles, between packets, and/or within packets at predetermined locations. Pilot-tone pulses may even be implemented for the purpose of transmitting control information. The gain of the pilot tones or pilot-tone superpositions may be adjusted to ensure a low PAPR.

Figures 2, 3:
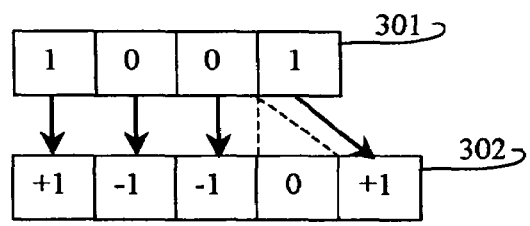
FIG. 2 illustrates a CI code matrix, which is a mathematical representation of a CI coding method. In this case, the CI code matrix illustrates the steps required to produce a CI code having predetermined amounts of spreading and redundancy.
FIG. 3 illustrates a method of providing for symbol insertion into a data stream prior to being operated on by a CI process. Such symbol insertion may be indicative of channel coding (e.g., parity check coding, block coding, or convolutional coding), encryption, or spread-spectrum coding.

FIG. 2 illustrates a CI coding process wherein a plurality K of data symbols $s_k(t)$ are provided with one or more zeros to produce a number N of new data symbols $s_n(t)$ that are mapped to a plurality N of CI symbols $w_n(t)$. Each new data symbol $s_n(t)$ multiplies a column (such as column 201) of an N×N CI code matrix and then each CI symbol $w_n(t)$ is generated by summing all of the elements in each corresponding row (such as row 203). The CI symbols $w_n(t)$ may be provided with weights, such as normalization weights, to provide for a predetermined total transmission power of the CI symbols $w_n(t)$.

In one set of embodiments of the invention, each zero value may indicate one or more sequences of data bits. Thus, the zeros may provide parity checks or provide for conveying certain patterns in the data, as well as provide for redundancy. FIG. 3 illustrates a zero-valued transmitted data symbol that follows a set of two consecutive same-valued information bits (e.g., consecutive zeros shown in bit stream 301) or transmitted data symbols (e.g., the corresponding consecutive values of −1 in data symbol stream 302). Similarly, zero values may indicate other combinations of information bits and/or transmitted data symbols. Other relationships between information bits and/or transmitted symbols may be conveyed by zeros and/or groups of zeros. Zero values may be used to transmit information, including data, error correction and control information.

Figures 4, 5:
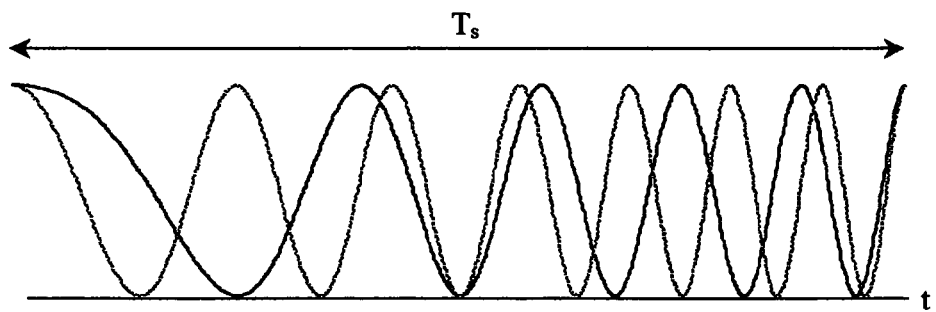
FIG. 4 is a matrix representation of a method for generating a CI code in response to channel coding applied to a predetermined block of input data symbols. Although the matrix demonstrates the present invention with respect to block CI coding, sequential or sliding CI codes may be employed.
FIG. 5 illustrates a pair of orthogonal chirp waveforms in the time domain.

Parity-check values, or any other symbols indicating information symbol values or combinations of information symbol values may be integrated into an information symbol vector. FIG. 4 illustrates a CI coding process wherein a plurality K of data symbols $s_k(t)$ are provided with one or more parity check symbols (e.g., $p_m$) to produce a number N of total data symbols $s_n(t)$ that are mapped to a plurality N of CI symbols $w_n(t)$. Parity check values and/or other values may be added to the information symbol vector in place of, or in addition to the zero values. Low-density parity check values may be employed. Parity-check values and other symbols indicating information symbol values or combinations of information symbol values may be appended, prepended, or interleaved with respect to the information symbol vector.

Windowing, such as frequency-domain filtering or time-domain filtering, may be provided to CI codes. For example, a raised-cosine window may be applied to CI code values as if the code values corresponded to carrier frequencies in a CI-based multicarrier system. Orthogonal codes may correspond to the CI code values that produce raised cosine pulses in the carrier-superposition space having a minimum inter-symbol (i.e., inter-pulse) interference. Similarly, any other form of windowing may be applied, such as Bartlet, Hamming, Dolph Chebychev, Gaussian, etc.

Windowing in the code space (i.e., superpositions of the code values) widens the pulse width of the constructive-interference pulses in the carrier-superposition space. This reduces the number of orthogonal pulse positions (i.e., codes). The number of orthogonal pulse positions equals the number of pulses that can fit into a pulse repetition period without inter-pulse (i.e., inter-symbol or multiple-access) interference. In the case of tapered windowing, the number of orthogonal codes is less than the number of code symbols per code. Thus, providing for windowed code-symbol spaces achieves similar benefits (such as spreading and redundancy) as inserting zeroes or parity-check symbols into an information symbol vector prior to coding.

In PCT application, PCT/US99/02838 (such as on page 6, lines 13-18, and on page 7, lines 27-32), Applicant describes shifting the frequencies of orthogonal carriers while maintaining the frequency separation that provides orthogonality for the given symbol duration. In the case where superpositions of the carriers are provided, the superposition envelope is unaffected by frequency shifts if the carrier-frequency separation $f_s$ and relative phases are preserved. FIG. 5 illustrates two chirp waveforms separated in frequency by $f_s$ and having a symbol duration of $T_s=1/f_s$. Coded data symbols, such as CI-coded symbols, may be provided across multiple chirp waveforms. In this case, the CI coder 105 and/or the modulator 106 are adapted to generate the chirp waveforms.

Chirped waveforms result from variations (such as linear variations) in frequency with respect to time. Chirped waveforms commonly employ linear frequency shifts. Data modulated on a chirped waveform can benefit from frequency diversity, as well as additional performance benefits in a multipath environment. Chirped waveforms are typically not employed in communications due to the need for analog baseband components and their associated complexity. Chirped transmitters typically employ voltage-controlled oscillators, and receivers require multiple matched filters. A receiver requires a separate matched filter for each desired waveform.

Chirped waveforms would be more applicable to digital communications if a more effective multiple-access scheme was provided and baseband transceiver processes were implemented with simple digital algorithms, such as Fourier transforms.

Orthogonal chirped waveforms are provided by maintaining the same type of frequency separation as required in CI and OFDM. Thus, orthogonal multiple access can be employed. Different data symbols and/or user channels may be mapped onto different chirps. The invention provides for combinations of chirp and code division multiplexing. A multipath environment introduces time-delayed versions of the received signals, which can be processed in spatial subspaces (i.e., space-chirp processing). Similarly, space-chirp coding may be employed wherein channel coding is provided over spatial/chirp channels.

Multiple carrier chirps are provided with the same time-dependent chirp waveforms f(t) separated in frequency by $f_s=1/T_s$, where $T_s$ is the symbol duration of transmitted data. This provides orthogonality between different chirp waveforms:

$$x_n(t)=s(t)e^{i(2\pi(f_c t)+nfs)t)}$$

Orthogonal chirp waveforms can be filtered or separated by applying CI sampling or the CI OFFT. Similarly, a dynamic form of the DFT/IDFT process can be implemented that employs a sampled chirp in place of the usual constant-frequency terms:

$$X(mf_o(t))=\Sigma x(nt_o)e^{-in2\pi mf_o(t)t_o}$$

where $f_o(t)$ is a time-dependent frequency and variable m indicates a particular chirp waveform, such as defined by its start frequency. An inverse DFT can be implemented with chirped-frequency terms to map one or more data symbols to orthogonal chirped-frequency waveforms. Furthermore, other types of transforms, including FFT and IFFT transforms may be implemented with chirped frequency terms. The CI coder 105 and/or modulator 106 may employ a chirp z transform, such as described in U.S. Pat. Nos. 4,994,740, 5,073, 752, 5,257,284, 5,388,121, and 6,208,946, which are incorporated by reference in their entireties. The decoder 125 and/or the demodulator 126 are adapted to provide for a corresponding inverse transform.

Orthogonal code sequences may be generated from the transforms. For example, the terms $e^{-in2\pi mf_o(t)t_o}$ may be employed as polyphase symbols of orthogonal code sequences for different orthogonal frequency-varying waveforms.

Figure 6A:
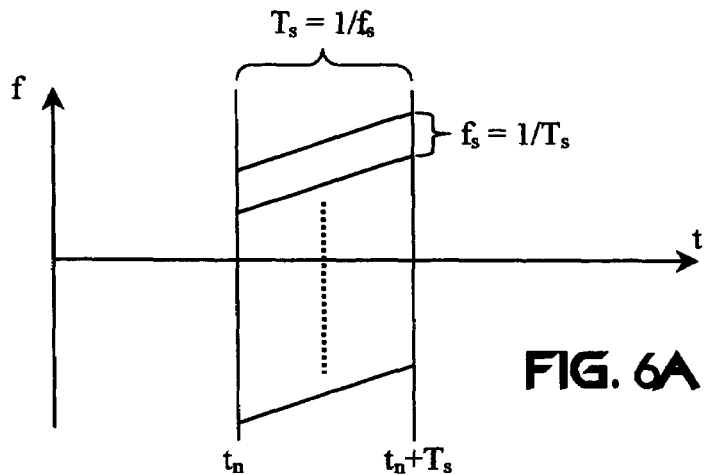
FIG. 6A is a frequency-domain representation of a set of orthogonal chirp waveforms.

FIG. 6A illustrates a plurality of orthogonal linear-frequency chirps having frequency separations of $f_s$ between chirps. Although the chirps corresponding to (and overlapping in) a symbol interval $T_s$ are not shown with a cyclic prefix, a preferred embodiment of the invention includes a cyclic prefix or guard interval prepended to each set of chirp waveforms corresponding to a particular symbol duration. This is particularly preferable when the chirp waveforms are transmitted in multipath environments. The chirp waveforms may be analog or digital waveforms.

Figure 6B:
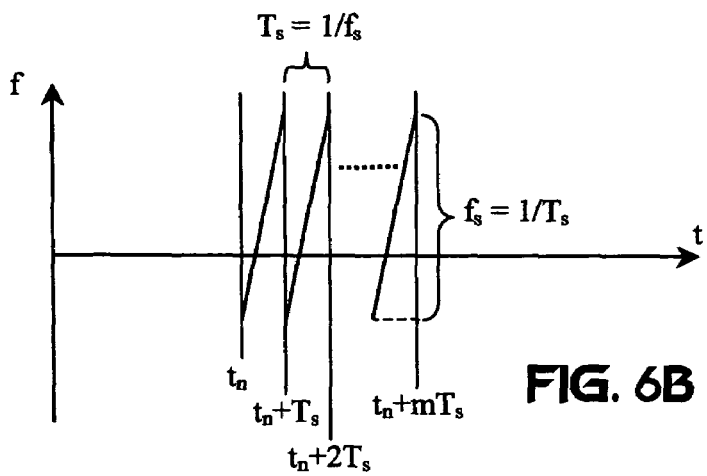
FIG. 6B is a frequency-domain representation of non-overlapping (and thus, orthogonal) chirp waveforms.

The orthogonal chirp waveforms in FIG. 6B do not overlap in any of the symbol intervals. Similarly, it is preferable to include a cyclic prefix or guard interval for each chirp in each symbol interval $T_s$. The frequency rate-of-change of the chirp waveforms may be adapted to provide for a predetermined number of chirps per symbol interval $T_s$. Alternatively, predetermined symbol durations may be provided by providing predetermined frequency rates-of-change. This is an important aspect for controlling the symbol duration in constellation/duration processing. For example, higher-order modulations (i.e., larger symbol constellations) may be employed by providing for increased symbol durations while preserving the duration of each cyclic prefix or guard interval. Thus, fewer waveforms, and thus, fewer guard intervals are required. Alternatively, multiple symbol durations (and thus, chirp waveforms) may be employed to transmit higher-order modulations.

Figure 6C:
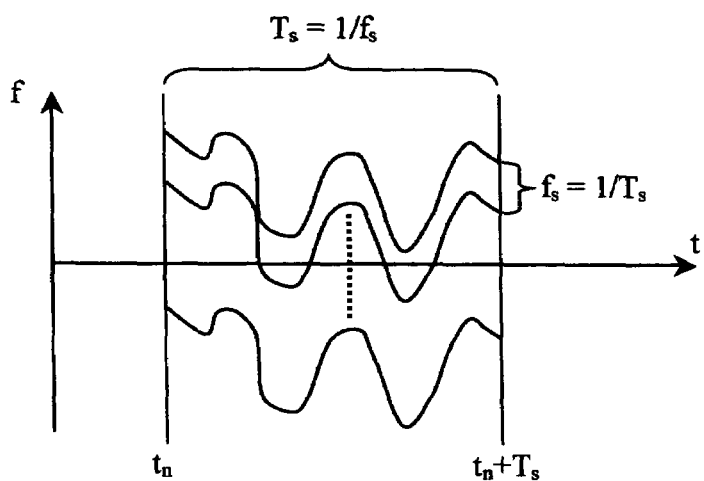
FIG. 6C represents the possibility of other types of orthogonal chirped waveforms that maintain a predetermined subcarrier-frequency separation.
Figure 6D:
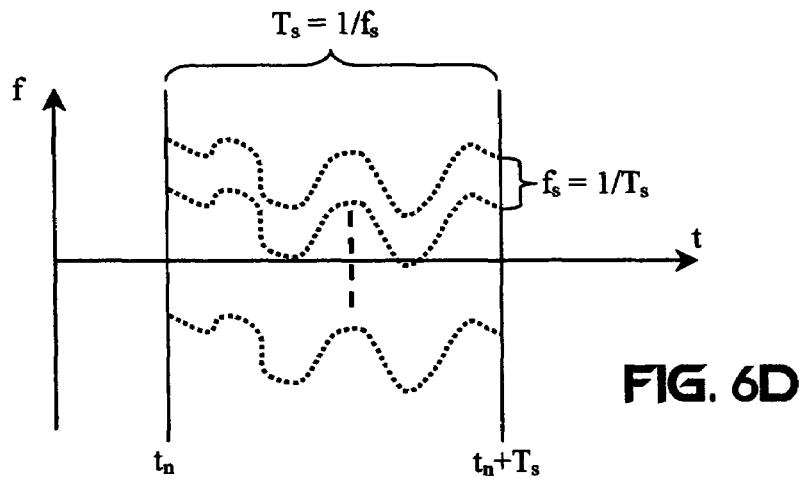
FIG. 6D illustrates a set of digital sequences that provide a set of orthogonal waveforms. Such waveforms may be a digitized form of linear chirps (or other orthogonal frequency variations). Alternatively, such digital waveforms may embody slow or fast (i.e., on the order of a symbol period) hops in a frequency-hopped spread spectrum protocol between orthogonal subcarriers.

FIG. 6C represents classes of other orthogonal frequency-varying waveforms that may be implemented in the invention. These waveforms may be characterized by non-linear functions. In the case where non-linear functions are employed, the frequency separations $f_s$ may be adapted to provide orthogonality. Such adaptations may include constant or varying frequency separations $f_s$. The waveforms shown in FIG. 6C (and produced by a transmission system of the present invention) may include analog (i.e., continuous) or digital waveforms. FIG. 6D illustrates a set of orthogonal digital sequences that provide a set of orthogonal waveforms, as described with respect to FIG. 6C.

Figure 6E:
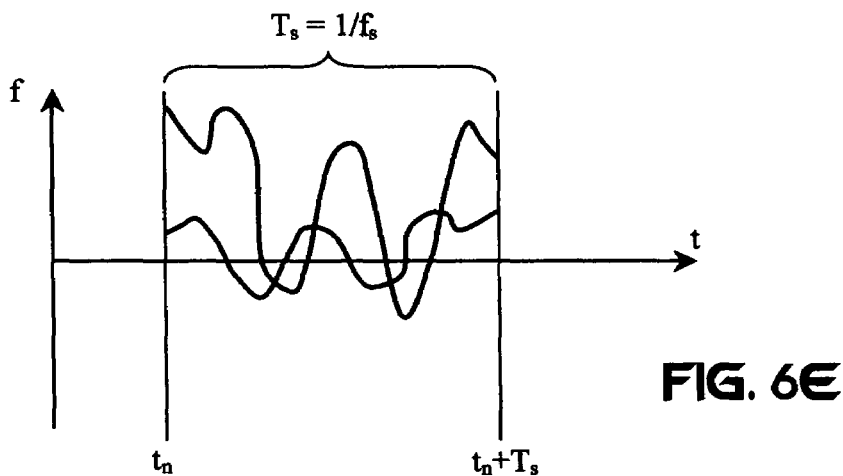
FIG. 6E represents classes of orthogonal frequency-varying waveforms that may overlap at one or more locations. These waveforms may optionally include static or dynamic complex weights that provide for orthogonality.

FIG. 6E represents classes of orthogonal frequency-varying waveforms that may overlap at one or more locations. The frequency separation between each waveform varies with respect to time. The frequency separation and optionally, complex weights applied to the waveforms, may be selected such as to provide orthogonality between the waveforms.

Figure 6F:
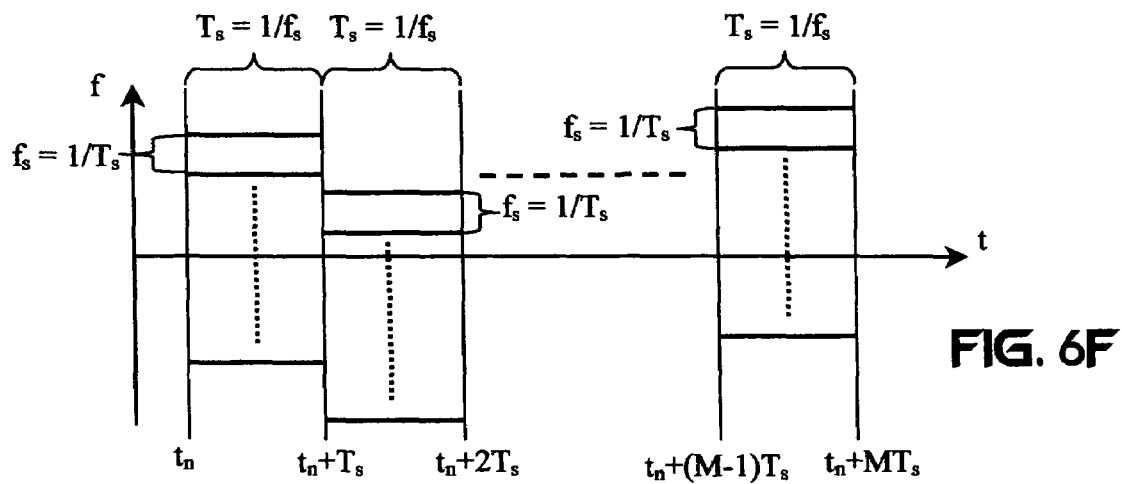
FIG. 6F represents orthogonal fast frequency hopped waveforms.

In FIG. 6F, each set of carrier frequencies (which have frequency separations equal to integer multiple(s) of $f_s$) assigned to a predetermined user may be hopped to different sets of carriers (which also have frequency separations equal to some integer multiple(s) of $f_s$). Accordingly, the CI coder 105 and/or the modulator 106 are adapted to provide for frequency hopping and at least one of the demodulator 126 and the CI decoder 125 are adapted to process received frequency-hopped signals. The frequency hops shown correspond to the symbol durations $T_s$. Alternatively, frequency hops may be provided at integer multiples of the symbol duration $T_s$. In each of these cases, sets of waveforms may be allocated to a particular user or to at least one group of a plurality of users.

Figure 6G:
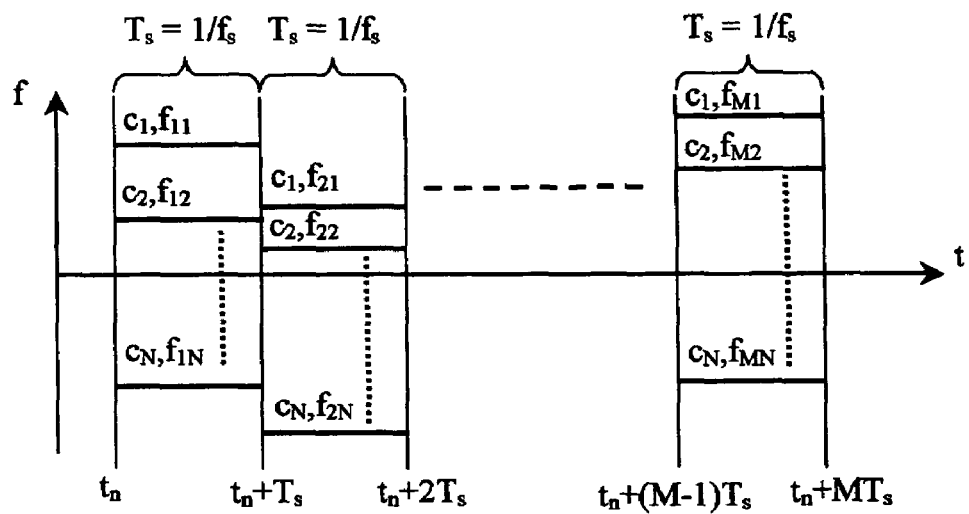
FIG. 6G represents a set of coded frequency hopped waveforms.

FIG. 6G illustrates coding applied to each of a plurality of carriers that are hopped over a plurality of symbol intervals $T_s$. The carriers have frequency separations equal to integer multiple(s) of $f_s$. Coding may include any form of channel coding, multiple-access coding, spreading, and/or encryption. Coding may be provided across time intervals (i.e., hops) as well as (or instead of) frequencies. The characteristics of the hopping patterns may be similar to those described with respect to FIG. 6F. Similarly, hopping may be provided between the orthogonal waveforms shown in FIGS. 6A, 6B, 6C, 6D, and 6E. Transmission symbols may be coded across orthogonal waveforms, such as chirp waveforms, such as shown in FIGS. 6A, 6B, 6C, 6D, and 6E. Furthermore, the symbols may be coded across multiple symbol intervals. Adaptations to the transmit circuitry (such as CI coder 105 and/or modulator 106) to generate particular waveforms described herein are paired with complementary adaptations to the receive circuitry (such as the demodulator 126 and the decoder 125).

Figure 7A:
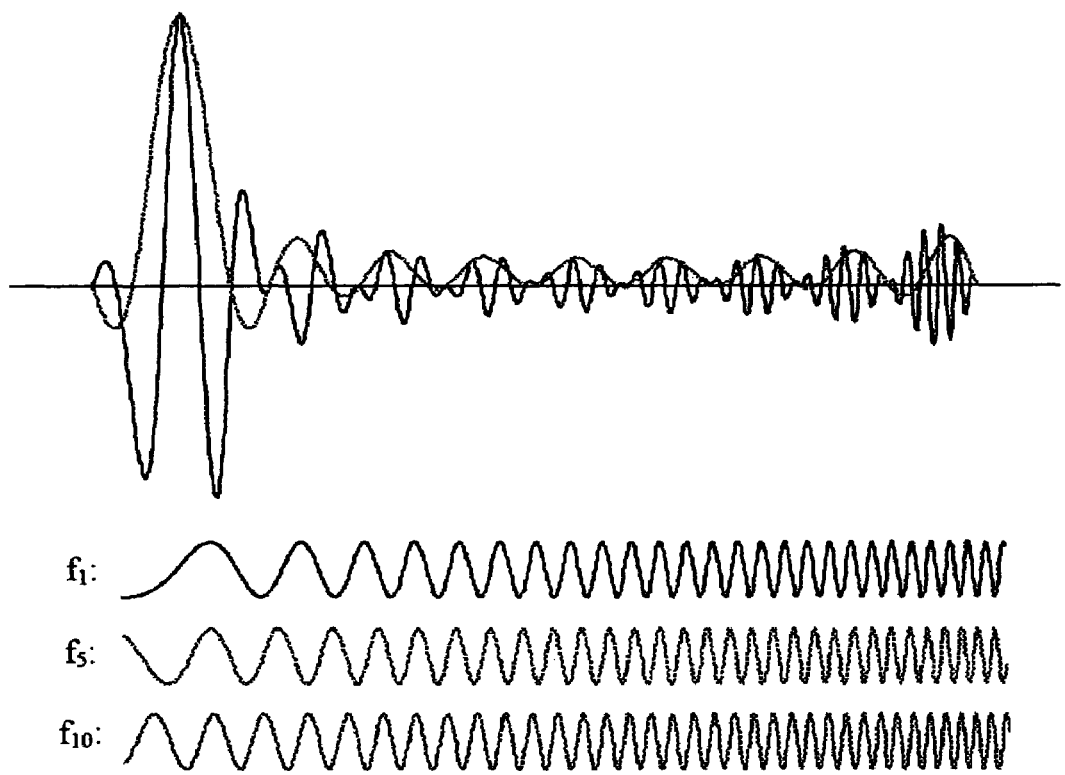
FIG. 7A illustrates a CI pulse generated from a superposition of orthogonal chirp waveforms. The pulse represents a phase space upon which a data symbol is mapped when it is modulated onto the chirp waveforms with a given set of phases, as shown. Other phase spaces (i.e., pulses) that are orthogonal to the phase space (pulse) shown may also be provided. Thus, a plurality of data symbols may be mapped to a plurality of orthogonal pulses. The process of generating chirp subcarrier weights is similar to the methods disclosed with respect to FIGS. 2 and 4.

FIG. 7A illustrates a first CI pulse generated from a superposition of ten linear-chirp waveforms. A first, fifth, and tenth chirped waveform are illustrated with respect to the same time axis illustrated with respect to the CI pulse. The chirped waveforms are orthogonal waveforms. The pulses and chirped waveforms (i.e., the carriers) are illustrated within a symbol interval $T_s$ corresponding to the inverse of the frequency separation $f_s$ of the chirped waveforms. In this case, the chirped waveforms are provided with a first set of phases that results in phase alignment of the waveforms at a first predetermined instant in time. The resulting superposition pulse is centered at that time instant.

Figure 7B:
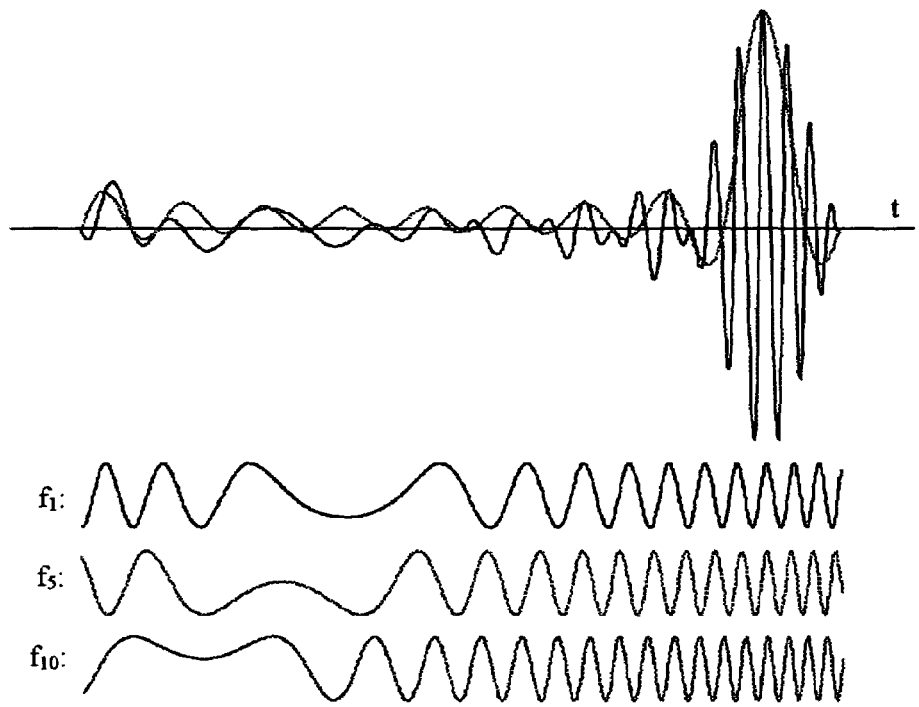
FIG. 7B illustrates a second pulse generated from the same subcarriers as shown in FIG. 7A.

FIG. 7B illustrates a second CI pulse generated from a superposition of the same ten linear-chirp waveforms shown in FIG. 7A. The first, fifth, and tenth chirped waveforms are illustrated with respect to the same time axis illustrated with respect to the CI pulse. The CI pulse is shown with a reference CI pulse generated from a similar set of (i.e., the set has the same frequency separation, number of carriers) constant-frequency carriers. In this case, the chirped waveforms are provided with a second set of phases that results in phase alignment of the waveforms at a second predetermined instant in time. The second pulse is centered at that time instant.

The pulses shown in FIGS. 7A and 7B represent polyphase coding applied to the chirped waveforms to produce substantially orthogonal pulse positions. The CI codes map data symbols modulated on the chirped waveforms to orthogonal pulses. Thus, the phase codes are substantially orthogonal. Each pulse may correspond to a particular data symbol used by a single user. In this case, a set of chirped waveforms may be allocated to a particular user. Alternatively, a plurality of users may share the same set of chirped waveforms and the orthogonal codes may be employed for multiple access. In any of these cases, as well as any variations of these cases, a cyclic prefix or guard interval (not shown) may be provided to the chirped waveforms and/or the resulting pulses or pulse streams. Alternatively, receiver 127 may include a Rake receiver or some alternative time-domain equalizer, as is well known in the art.

In the case where multiple pulses are generated within a given symbol interval T, the coding provided to the carrier may be characterized by a combination of polyphase and poly-amplitude carrier weights or codes. Alternatively, pulse waveforms may be stored in memory (not shown) and provided with time offsets. The pulses and/or the carriers may be modulated with information symbols to be transmitted. Similarly, information may be embedded in the coding provided to the carriers.

Figure 7C:
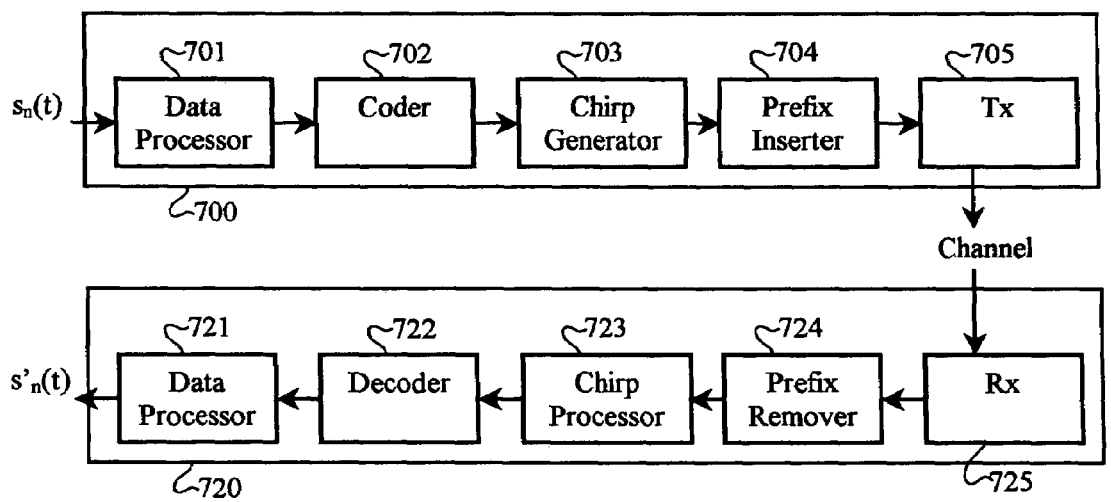
FIG. 7C represents method and apparatus embodiments of a chirped/hopped transmitter/receiver system of the present invention.

FIG. 7C illustrates basic components of a transmitter 700 and a receiver 720 that may be used to provide communication on chirped waveforms. Information symbols may be transmitted on individual chirped waveforms. Alternatively, data symbols may be spread over multiple chirped waveforms via coding. Coding may include channel coding, spread-spectrum coding, and/or multiple-access coding.

In the transmitter 700, a data processor 701 provides appropriately formatted information in the form of data bits or data symbols to an optional coder 702. Information may include headers, preambles, control bits, training symbols, feedback information, and/or other types of system-control information, in addition to any digital (e.g., data) or analog (e.g., voice) payload. The coder 702 may provide error-correction coding or some other type of channel coding. For example, convolutional coding may be employed. Similarly, spreading or multiple-access coding may be provided. Any combination of bit coding and modulation-based symbol processing may be provided by the coder 702. Coded data symbols are input to a chirp generator 703. The chirp generator 703 may provide a digital chirp transform function adapted to map the data symbols onto chirped waveforms. The chirp transform function may be similar to an inverse Fourier transform function. In particular, the transform function may be adapted to produce a time-domain signal. Furthermore, the chirp generator 703 may provide coding. The output of the chirp generator 703 may be an analog (continuous) or digital signal. An optional prefix inserter 704 is adapted to prepend a cyclic prefix or guard interval to the chirp waveforms or superposition signal produced by the chirp generator 703. A transmission system 705 is typically provided for converting a baseband or IF signal into a signal that is appropriate for transmission in a communication channel. Thus, transmission systems may include a variety of signal-processing elements, including D/A converters, filters, frequency converters, amplifiers, modulators, impedance matching circuits, array-processing circuits, channel estimation circuits, channel compensation (e.g., predistortion) circuits, system-control processors, power-control circuits, etc.

The receiver 720 includes a receiving apparatus 725 adapted to couple transmissions from a communication channel and adapt the received signals for processing by other signal processing modules in the receiver 720. Thus, the receiving apparatus 725 may include a variety of signal-processing elements, including amplifiers, filters, AGCs, A/D converters, frequency converters, demodulators, array processing systems, channel compensation systems, system-control processors, symbol mapping modules, synchronization systems, feedback loops, etc. Signals output by the receiving apparatus 725 may be analog or digital signals.

A prefix remover 724 is adapted to remove any guard interval or cyclic prefix on the received chirped waveforms. A chirp processor 723 extracts and/or estimates information impressed on the chirped waveforms. The chirp processor 723 may be adapted to perform a chirp transform operation similar to a Fourier transform operation to obtain symbol values impressed on the chirp waveforms. The chirp processor 723 may be adapted perform decoding. An optional decoder 722 processes received coded data symbols or data bits to produce uncoded data symbols or data bits, or estimates of data symbols or data bits. Decoding may include hard or soft decision processes. A data processor 721 formats the data as necessary for output.

Figure 8:
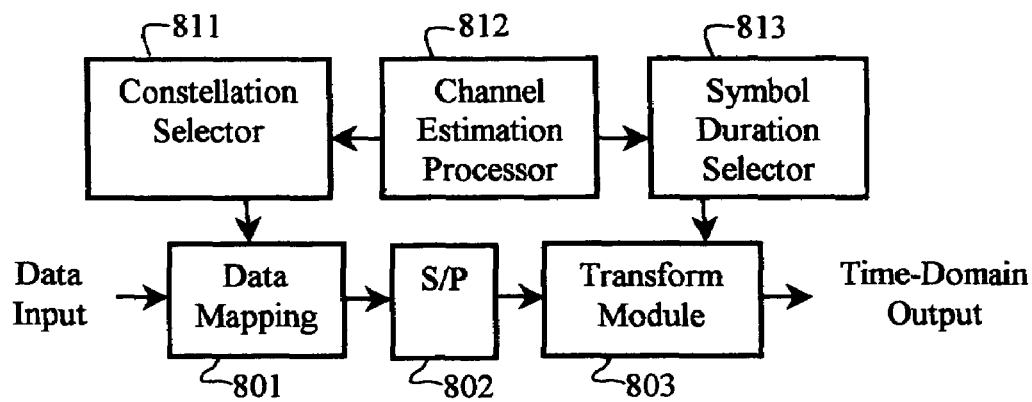
FIG. 8 illustrates a method and apparatus for selecting symbol duration and symbol constellations in a multicarrier transmission system.

A method and apparatus for performing constellation/duration processing is illustrated in FIG. 8. A data-mapping module 801 converts each set of data bits to a data symbol having a predetermined or adaptable constellation of values. The number of data bits mapped to a data symbol and the number of constellation points are typically set relative to one another. The data symbols are processed by a serial-to-parallel processor 802 to generate a plurality of parallel data symbols to a transform module 803. The transform module 803 is adapted to map (or otherwise impress the data symbol values) to orthogonal signal waveforms. The signal waveforms may include multicarrier waveforms, such as OFDM, MC-CDMA, spread OFDM, CI, CDMA-OFDM, multicode OFDM, or any other well-known multicarrier signals. Similarly, the multicarrier waveforms may include chirped waveforms, coded chirped waveforms, or in particular, CI-coded chirped waveforms. Coded chirped waveforms may include adaptations of MC-CDMA or spread-OFDM to orthogonal chirped waveforms or CI-coded waveforms. Furthermore, multicarrier waveforms may include space-time, space-frequency, or additional forms of diversity-parameter spaces and signal sub-spaces. The output of the transform module 803 is typically at least one time-domain signal.

The output may be characterized by sub-space, or coded subspace signals. In this case, the transform module may be coupled to a coded sub-space transmitter or an array of transceiver elements. Appropriate spatial and/or sub-space processing is preferably provided at the corresponding receiver(s) of the transmitted signals.

A constellation selector 811 is adapted to work in conjunction with a symbol duration selector 813. The constellation selector 811 selects data symbol constellations, including all of the parameters thereof, including constellation size, constellation spacing, and the bit-to-symbol mapping algorithms and/or tables. The function of the constellation selector 811 may be adapted with respect to any of various performance measurements, including channel estimates, probability of error, SNR, SNIR, BER, etc. Accordingly, an optional channel estimation processor 812 may be coupled to the constellation selector 811 and the symbol duration selector 813. The function of the constellation selector 811 and the symbol duration selector 813 may be dynamically adapted to changing channel conditions, data-rate requirements, transmission types, subscriber services, power control, multiplexing/multiple access, and link priority.

The symbol duration selector 813 provides a predetermined transmit symbol length relative to the constellation size selected. The symbol length may also be adapted relative to other factors, including receiver performance, network control, subscriber services (e.g., bandwidth requirements, error tolerance, and/or latency tolerance), transmission power, etc. In some of the cases of chirped-waveform transmissions, the duration of each waveform may be adjusted with respect to required symbol length. In the case of transmissions employing orthogonal waveforms having a fixed frequency separation $f_s$, a transmit symbol length may correspond to an integer multiple of the symbol durations ($T_s$) corresponding to the frequency separations $f_s$.

Although the invention is shown with respect to scaling the symbol length relative to constellation size, the invention may adapted to other functions. For example, the constellation size may be adapted independently of the symbol length. The symbol length may be adapted relative to a fixed constellation size. Adaptations of either the symbol length or the constellation size may be made with respect to adjusting or maintaining a predetermined transmit power per data bit or symbol. Adaptations may be made relative to changing channel conditions, power control, variable data rates, different subscriber services, different link characteristics, network control, frequency use, interference, and/or priority. In some embodiments of the invention, symbol length and/or constellation size selections and adaptations may be provided to each carrier independently. In various embodiments of the invention, frequency separations $f_s$ and symbol durations $T_s$ may be adapted.

Figure 9A:
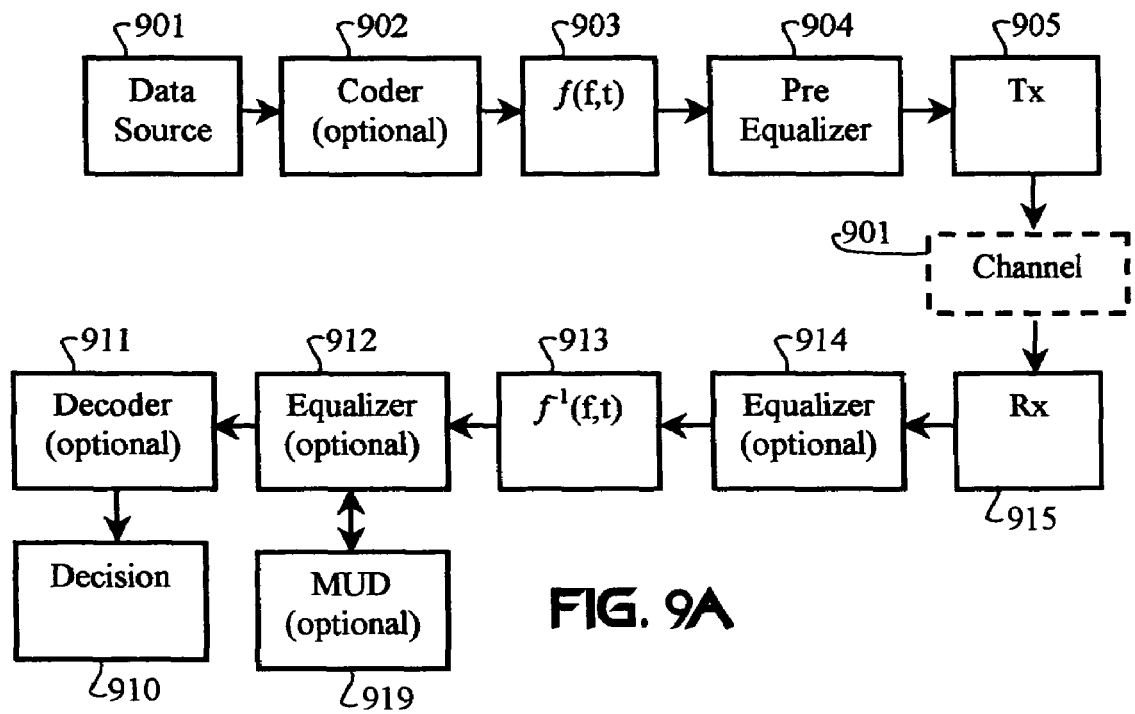
FIG. 9A illustrates a communication link employing transceivers of the present invention.

FIG. 9A illustrates a communication link employing transceivers of the present invention. A data source 901 provides optionally formatted data symbol or data bits to an optional coder 902. The coder 902 may provide channel coding of data bits, spreading, and or multiple access. A coder, such as coder 902, may map groups of data bits into data symbols. Coded data is coupled into a transform circuit 903 adapted to provide coded data and/or waveforms that convey the coded data. The transform circuit 903 may be adapted to map data symbols to CI codes, chirp codes, CI waveforms, and/or chirp waveforms. An optional pre-equalizer module 904 may be adapted to provide channel-compensation equalization to the symbol values and/or waveforms generated by the transform circuit 903. Equalization may take the form of frequency-domain equalization, time-domain equalization, and/or equalization specific to the signal space of the generated symbol values and/or waveforms. A transmitter module 905 provides for adaptation of an input baseband or IF signal for transmission into a communication channel 901.

A receiver module 915 is adapted to couple transmitted signals from the communication channel 901 and adapt the received signals for baseband and/or IF processing. An optional equalizer 914 may be employed to compensate for channel effects. A transform circuit 913 is adapted to complement the transform performed on the transmit side. An optional equalizer 912 may be employed after the transform circuit 913 to compensate for channel effects. A multi-user detector 957 may optionally be employed. A decision module 956 is adapted to estimate transmitted data bits. The decision module 956 may be adapted to perform any combination of hard decision, soft decision, and iterative feedback functions.

Figure 9B:
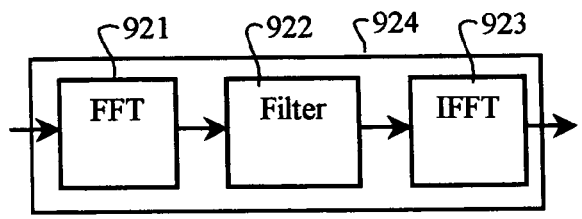
FIG. 9B illustrates basic components that may be employed in a frequency-domain equalizer.

FIG. 9B illustrates basic components that may be employed in a frequency-domain equalizer, such as possible embodiments of the equalizers 904, 912, and 914 shown in FIG. 9A. A transform module, such as an FFT 921, separates an input time-domain signal into a plurality of frequency components. The components may be processed in a filter 922 adapted to provide a predetermined or adaptive gain profile to the components. An inverse transform module, such as an IFFT 923 is adapted to convert the filtered components back to a time-domain signal.

Figure 9C:
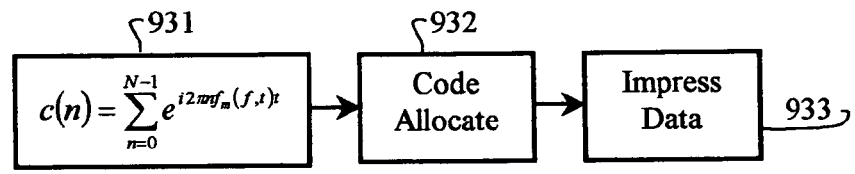
FIG. 9C illustrates basic components of a transform circuit of the present invention.

FIG. 9C illustrates basic components of a possible embodiment of the transform circuit 903. A chirp-transform code generator 931 is adapted to produce at least one of a plurality of orthogonal codes based on a chirp transform. A code allocation module 932 is adapted to allocate at least one code to at least one communication link. A data modulator 933 is adapted to impress at least one data symbol onto at least one code. Alternatively, data symbols may be impressed onto signals processed in the transform code generator 931 to produce information-bearing codes.

Figure 9D:
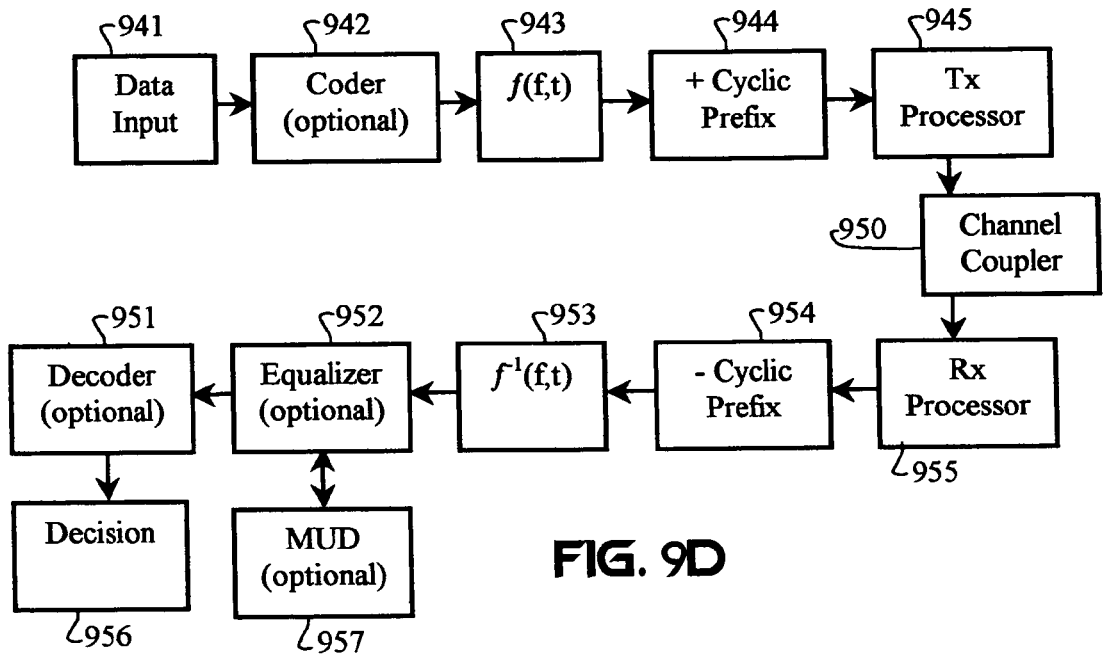
FIG. 9D illustrates transceiver method and apparatus embodiments of the invention.

FIG. 9D illustrates a transceiver of the invention. A cyclic prefix prepend module 944 is included on the transmitter side of the transceiver. However, the functionality of the module 944 may be incorporated into the transmitter module 905 illustrated in FIG. 9A. A cyclic prefix removal module 954 is shown on the receiver side of the transceiver. Similarly, cyclic prefix removal may be provided in the receiver module 915 shown in FIG. 9A. CI coder 942 and decoder 951 modules are provided. Invertible transform circuits 943 and 953 provide for complementary sub-carrier processing.

In one embodiment of the invention, cellular communications may be provided with multicarrier transmission protocols mentioned and disclosed herein and described in the publications incorporated by reference. In a cellular system, or in any system employing at least one form of spatial multiplexing or spatial division multiple access, individual carriers may be allocated to a particular user in each cell or geographical sector in a communication network.

In one aspect of the invention, each carrier in a set of carriers allocated to a particular user in a particular geographical area (e.g., a cell or a sector) is shared by at most one other user in a potentially interfering (e.g., nearby) geographical area. In a related aspect of the invention, no more that one carrier is shared between two potentially interfering users. For example, if a number n of carriers allocated to a particular user experiences interference from other users, there are n interfering users. Alternatively, some number other than one may be selected as the maximum number of carriers shared by any pair of substantially interfering users. Furthermore, the invention provides for allocation of carrier frequencies to users depending on their geographical locations. For example, carriers may be assigned to each user based upon their relative positions in a defined geographical region and/or their positions in neighboring geographical regions.

The terms neighboring and nearby may be used interchangeably, and are meant to convey the idea of cells or sectors sharing the same border of a particular cell or sector of interest (i.e., a subject cell), and may include other cells and/or sectors that are nearby (such as to potentially provide a source of interference to the subject cell), but do not necessarily share the same border with the subject cell or sector.

In one aspect of the invention, each base station or equivalent system is provided with a predetermined set of carriers for allocation to users in the cell. It will be appreciated that descriptions herein relating to cells also pertain to sectors, or other spatial (e.g., geographic) regions in a communication network. The set of carriers is preferably allocated with respect to carriers allocated and/or available to neighboring cells. For example, carriers may be allocated to each of a plurality of neighboring or nearby cells in order to minimize interference on each carrier. Thus, a predetermined number of cells within a group of neighboring or nearby cells may share a predetermined number of the available carriers.

One or more carriers may be allocated throughout the neighboring or nearby cells such as to eliminate and/or greatly reduce the possibility of inter-cell co-channel interference. For example each of a plurality of carriers may be allocated to only one cell in a group of neighboring or nearby cells. Each of a plurality of carriers may be allocated to a predetermined plurality of (e.g., two) cells, thus permitting a small amount of inter-cell interference. The choice of which cells share which frequencies (especially with respect to how the frequencies are allocated to users within each cell) may be made in such a way as to minimize inter-cell interference. With respect to sectors or spatial division multiple access channels (including sub-space channels), the objective is to reduce or minimize inter-sector or co-channel interference.

In a preferred aspect of the invention, each user is assigned carriers in such a way as to reduce or minimize interference from users in nearby or neighboring cells. For example, the assigned carriers may be subject to interference from users in a plurality of nearby or neighboring cells. Thus, the interference is more likely to be uncorrelated interference. Also, interference from a user in a nearby neighboring cell interferes with only a small number of a particular user's carriers. The particular user also has carriers that experience low interference due to those carriers being shared by more-distant users (e.g., users in neighboring cells that are farther away) and/or carriers not being shared by any users in the group of neighboring cells. The number of shared carriers per user per cell may be selected relative to geographical conditions (e.g., terrain, distribution of users in a cell, etc.), channel conditions (multipath, co-channel interference, etc.), link priority, characteristics of subscriber services (e.g., tolerance to latency, tolerance to distortion), channel bandwidth, spectrum allocation, spectrum sharing, and/or predicted and/or measured receiver performance.

In another aspect of the invention, each base station or equivalent system is adapted to dynamically allocate carriers for users in the cell. Each cell may be provided with a predetermined set of carriers that a base station selects for allocation to each user in the cell. Allocation of the carriers to each user may be based on any of a number of parameters, including any of the following parameters:

Link channel conditions to/from each user. For example, carriers may be selected for each user so as to avoid deep fades, since different users are likely to experience different multipath channels.

Required link data rates, or channel bandwidth. For example, the number of carriers, as well as the carrier bandwidths may be selected relative to the required throughput.

Channel bandwidth. For example, each user may be provided with a set of carriers distributed over a predetermined frequency band such that the set spans a bandwidth equal to or greater than the coherence bandwidth of the channel. Similarly, the carriers may be selected such that the spacing between the carriers equals, or is greater than, some predetermined bandwidth, such as the coherence bandwidth of the channel. Different links are likely to have different coherence bandwidths.

Type of communications (e.g., voice, data, video, multimedia). Different types of communication are sensitive to different types of link performance. For example, voice communications can tolerate relatively high distortion, noise, and interference. Data communications can typically tolerate latency.

Doppler effects. For example, Doppler effects may de-orthogonalize narrowband carriers allocated to different users experiencing different Doppler shifts. Thus, in some applications, it may be preferable to avoid allocating contiguous carrier frequencies to a plurality of users characterized by different Doppler shifts, particularly users that are located with respect to each other and/or with respect to a base station such that interference may occur due to the Doppler shifts.

Geographical distribution of users within a cell. Frequency reuse within a cell may be provided via spatial division multiplexing. Interference mitigation and reduction of distortion may be provided by recording and anticipating the types of channel conditions (e.g., multipath fading, delay, fast fading, shadowing) users are likely to encounter in certain geographical locations. Thus, carrier selection may be part of a predistortion or interference-mitigation process. Similarly, different sets of frequencies may be allocated to different geographical locations within a cell.

Geographical distribution of users in neighboring or nearby cells. Frequency selection in each cell may be adapted with respect to frequencies allocated to users in nearby cells, such as to minimize or avoid interference. Furthermore, the geographical locations of users in other cells may be considered with respect to allocating frequencies to at least one user in a particular cell of interest in order to mitigate the effects of interference. For example, a user may be provided with one or more carriers with respect to that user's location relative to the location of one or more users in other cells that may share (or otherwise interfere with) at least one of the user's allocated carriers.

In yet another aspect of the invention, sets of carriers provided to each cell for allocation the users in the cell may be transferred between cells. In some cases, carriers or carrier sets may be exchanged between cells. The criteria for transferring carriers between cells are similar to the criteria for allocating carriers in each cell to users in the cell. Carrier transfers may be made to mitigate the effects of interference, provide improved load balancing in a network of cells, scale to changing demands for resources in each cell, and facilitate efficient frequency-reuse patterns. This aspect of the invention may provide for overlapping service areas (i.e., cells) and assists in dynamic re-sectorization of the cellular architecture. Dynamic re-sectorization may include selecting and adapting boundaries between cells and/or implementing micro-cells as necessary. Consequently, inter-cell and/or intra-cell carrier allocations are anticipated to be an integral part of hand-off procedures between cells, including soft hand-offs. Thus, in some embodiments of the invention, neighboring cells may share at least some of the same carriers that are allocated to users near their common cell boundaries. Furthermore, carrier allocation between cells may be an integral part of a process known as dynamic spectrum allocation.

Figures 10A, 10B:
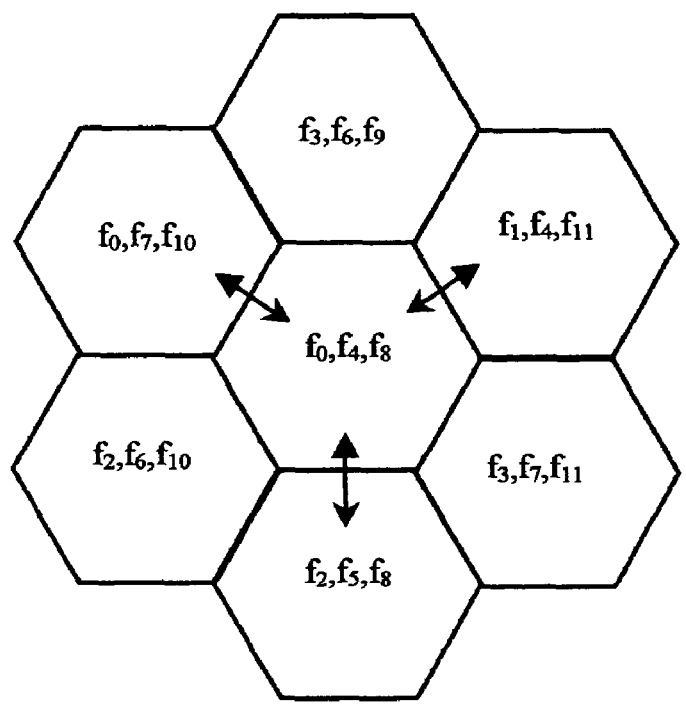
FIG. 10A illustrates a set of 12 carrier frequencies that can be allocated to a plurality of users in each of a plurality of cells.
FIG. 10B illustrates the set of allocated frequencies $f_0$, $f_4$, and $f_8$ corresponding to user one in cell one.

FIG. 10A illustrates a set of 12 carrier frequencies that can be allocated to a plurality of users in each of a plurality of (up to eight) cells. Each column corresponds to a cell, and each of the four different numbers in each column corresponds to a frequency allocation of a user in the cell. Thus, user 1 in the first cell is allocated frequencies $f_0$, $f_4$, and $f_8$. It is apparent that other patterns, such as non-repeating patterns relative to each cell, may be employed.

FIG. 10B illustrates the set of allocated frequencies $f_0$, $f_4$, and $f_8$ corresponding to user one in cell one. Frequencies allocated to other users in neighboring cells are also shown. In this case, each frequency corresponding to user one in cell one is shared by only one user in a neighboring cell. In this case, the users that share one of the frequencies allocated to user one in cell one do not share the same cell.

It will be appreciated that the various embodiments and aspects of inter-cell multiplexing described previously may be implemented with chirped carriers or other types of waveforms. For example, in the case where linear chirped waveforms are provided, users may share chirp rates and/or chirp frequencies.

A base station or network controller may provide for dynamic spectrum allocation to facilitate spectrum sharing, improve bandwidth efficiency, and mitigate the effects of interference and channel distortion. The following steps may be implemented in allocation methods employed by the invention:

a. Users are allocated different numbers of carriers with respect to individual user BW requirements. Similarly, the bandwidth of one or more carriers used by each user may be selected with respect to BW requirements. Coding parameters, such as code rate, constraint length, constellations, etc. may be adapted to transmission and/or reception parameters, including, but not limited to, bandwidth, priority, transmission information type, receiver performance (e.g., BER, P(e), confidence measure, etc.), channel conditions (i.e., SNR, multipath, co-channel interference, etc.).
  b. Each user's carriers are distributed over different system channels.
  c. Different systems share or exchange radio-channel resources (e.g., spectrum).
     i. Static allocation: each system divides its spectrum into frequency channels and allocates some of the channels to other systems in exchange for channels from other users.
     ii. Dynamic allocation: each system provides some of its spectrum to users in other systems based on spectrum availability and/or spectrum lease. A system may tolerate additional MAI to provide the exchange.
  d. Users are dynamically allocated carriers of different frequencies with respect to channel conditions, which may be determined via channel estimation. Since channel conditions change relative to time as user locations change, dynamic channel allocation may be performed relative to time-dependent criteria.

The input bit stream is coded (e.g., convolutionally encoded) with a predetermined code rate R prior to being interleaved and punctured.

CI coding, such as CI codes applied to frequency-domain carriers, may be used for multiple access or in single user systems. Similarly, CI coding applied to other diversity parameters, including sub-space processing or sub-space coding, may be employed in single user or multiple-access systems. In particular CI may be applied to single-user channels employing a separate means (e.g., frequency division multiplexing, time division multiplexing, code division multiplexing, spatial division multiplexing, or any other multiplexing protocol) of multiple access.

Each set of CI symbols, wherein a set is identified as a group of symbols applied to multiple carriers within a symbol interval, are typically provided with a guard interval, or cyclic prefix, as is typically done in all multicarrier transmission protocols. However, inter-symbol interference may occur in a multicarrier CI system due to the combination of multipath effects and CI spreading. Inter-symbol interference occurs in the single-user case. Additionally, multiple-access interference may occur in the multiple-access case where CI-coded carriers provide for multiple access. Thus, the frequency-domain channel transfer function of a CI system with a single antenna can be modeled with a MIMO flat fading matrix. Consequently, any of various techniques, such as matrix reduction or successive interference cancellation (e.g., BLAST), may be employed. The frequency-domain channel transfer function may also be adapted to multi-antenna systems. Thus, the resulting transfer function may characterize dimensions of space and frequency. Solutions for spatial processing with multiple antennas may be combined with solutions to the frequency-domain inter-symbol interference solutions.

Successive interference cancellation algorithms provide for sequential detection of symbols in each received set. Each step involves detecting, or estimating, a symbol and then subtracting it from the received signal set. This technique reduces interference for the next symbol to be detected/estimated. Thus, it is desirable to first process symbols on carriers having the highest reliability (e.g., high SNR). In a preferred embodiment of the invention, data symbols are non-uniformly spread over the carriers. Thus, a particular carrier corresponds to a particular data symbol more than the other symbols. Each data symbol has an association with a particular carrier that conveys the data symbol with a greater valued weight with respect to other data symbols. In some applications, more than one data symbol may be coded with preference to a particular carrier. In some applications, more than one carrier may provide preference to one or more given data symbol.

Non-uniform coding is indicated by the following CI code:

$$C_{nu} = \alpha I + (1-\alpha)C$$

The non-uniform CI code matrix $C_{nu}$ includes an identity matrix I (a matrix of zeros except for a diagonal of ones) weighted with some predetermined weight a (which may be determined or adapted relative to directly or indirectly measured channel conditions) and a weighted CI code matrix C. The CI matrix C may be any type of CI matrix, such as a matrix of basic CI codes, an advanced CI code matrix, or a hybrid CI code matrix. A transmitter may set the value of a based on training symbols or pilot tones. Similarly, the value of a may be set with respect to measured receiver performance, such as probability of error, SNR, BER, etc. Alternatively, the matrix $\alpha I$ may be provided with non-uniform diagonal elements. The values of the diagonal elements may be selected and/or adapted relative to channel conditions, such as flat fading on each carrier frequency. In other applications, the matrix $\alpha I$ may be provided with non-zero non-diagonal, or cross terms.

In a preferred embodiment of the invention, the identity matrix I is replaced by the following diagonal matrix of complex terms:

$$\begin{bmatrix} x_1 + iy_1 & 0 & \cdots & 0 \\ 0 & x_2 + iy_2 & \cdots & 0 \\ \vdots & \vdots & \ddots & 0 \\ 0 & 0 & \cdots & x_N + iy_N \end{bmatrix}$$

The complex terms $x_n + iy_n$ may be selected to reduce the peak-to-average-power ratio (PAPR) of the transmitted multicarrier signal. Any technique for reducing the PAPR may be employed with respect to the selection of the complex terms. In one aspect of the invention, CI codes corresponding to a predetermined pattern and shape of pulses are employed in the set of complex terms. In another aspect of the invention, adaptive algorithms may be used to reduce or minimize the PAPR.

It should be appreciated that other variations and adaptations to the spreading may be made to provide for non-uniform spreading. For example, any appropriate set of poly-amplitude codes may be employed for spreading. Some classes of CI codes characterized as poly-amplitude may be provided. Similarly, other types of poly-amplitude codes or combinations of codes may be employed to provide for non-uniform spreading.

One family of polyphase/poly-amplitude codes includes CI codes used on orthogonal sub-carriers to synthesize a direct-sequence CDMA signal. These CI codes resemble the non-uniform code with the diagonal matrix shown previously. Accordingly, CI processing of a direct-sequence signal may include successive interference cancellation in the frequency domain.

Data symbols to be transmitted may include coded data symbols. Coding may take the form of convolutional, block, parity check (e.g., low-density parity check), iterative feedback, CI, or any combination of coding. Other forms of coding may be implemented. Some data symbols may be mapped with preference to particular non-uniform CI codes or carriers. For example, parity-check values may be mapped to carriers having superior performance of a predetermined group of carriers.

Any of the available detection schemes appropriate for a MIMO flat fading channel model may be employed. One such scheme includes successive interference cancellation, such as described as follows:

1. Equalize received signals
2. Decode signal with highest SINR (e.g., provide soft decision)
3. Estimated signal is subtracted from received signals
4. Return to step 2

Figure 11:
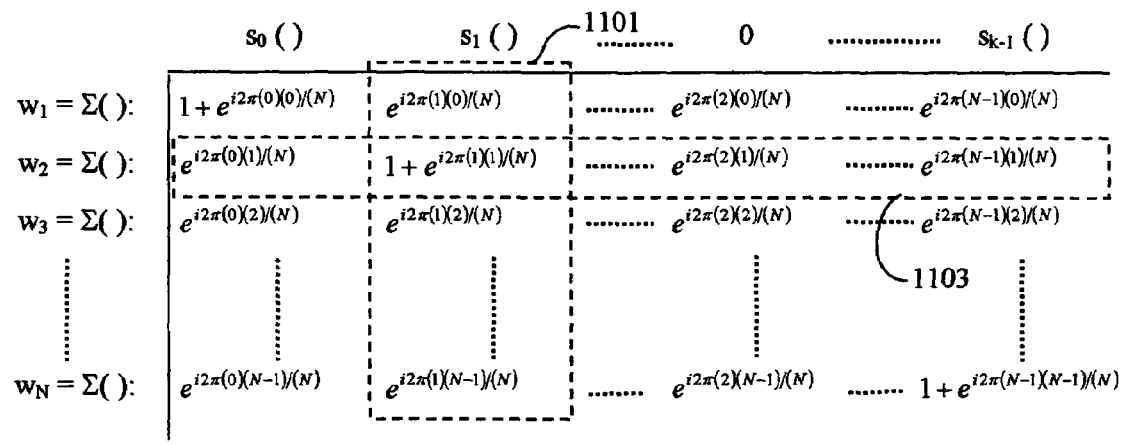
FIG. 11 illustrates a CI coding algorithm adapted to produce a non-uniform spreading of input data symbols $s_n(t)$ to generate a plurality of coded weights $w_n(t)$.

FIG. 11 illustrates a CI coding algorithm adapted to produce a non-uniform spreading of input data symbols $s_n(t)$ to generate a plurality of coded weights $w_n(t)$. In this case, the non-uniform spreading is enabled by including scalar constants in the diagonal elements of a complex CI code matrix. Non-uniform spreading may also be implemented by providing CDMA codes to data and then mapping the coded data to the CI phase spaces (i.e, pulses). Different values for the constants (including complex values), as well as a different distribution of the constants throughout the matrix, may be provided without departing from the scope of the invention. Each constant may have a unique value. The input data symbols $s_n(t)$ may include zeros and/or parity-check values. The coded weights $w_n(t)$ may be impressed on any set of orthogonal diversity-parameter values, including subspaces.

Figure 12A:
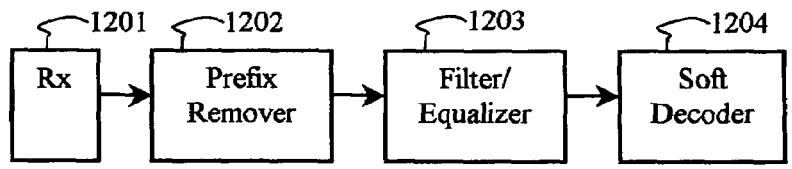
FIG. 12A illustrates the functionality of a receiver adapted to process and decode CI-coded signals.

FIG. 12A illustrates the functionality of a receiver adapted to process and decode CI-coded signals, including non-uniformly spread CI signals. A receiver system 1201 processes a received signal to provide an appropriate baseband or IF signal for processing by digital signal processing components in the receiver. Any cyclic prefix or guard interval prepended to the transmitted signal is removed 1202. Any necessary filtering and/or equalization 1203 may optionally be performed in a separate step or module prior to being decoded 1204.

Figure 12B:
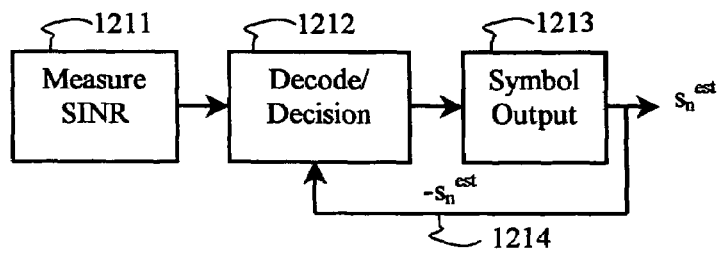
FIG. 12B illustrates a receiver of the invention adapted to employ successive interference cancellation.

The function of a decoder employing successive interference cancellation is illustrated in FIG. 12B. An SINR is measured 1211 for each sub-carrier (i.e., carrier) or sub-channel. The signal with the best SNIR is decoded 1212 and provided with a hard or soft-decision output 1213. The estimated interference resulting from the estimated symbol is then subtracted 1214 from any remaining subcarriers. The signal with the next best SNIR is processed in the same manner until all of the signals have been processed. Techniques for performing channel estimation, such as processing received known training symbols ad/or blind adaptive processing may be provided in the receiver.

Further adaptations to aspects and embodiments disclosed throughout the specification may include:
1. A plurality of tones assigned to the coded bits of an application is a subset of available tones.
2. A step of generating coded application bits is done for a plurality of users; and a step of transmitting the complex time-domain samples on a common channel includes a step of synchronizing transmissions among the plurality of users with respect to a destination receiver.
3. A channel used is a multipoint-to-point uplink channel.
4. The method described in number 2 further comprising the steps of:
   a. receiving the complex time-domain samples for each application from the common channel using a discrete multi-tone modem;
   b. transforming the complex time-domain samples to multi-tone symbols using a discrete Fourier transform;
   c. decoding the multitone symbols for each application into coded application bits for each application at a receiver using the plurality of tones assigned to the coded application bits; and
   d. decoding the coded application bits for each application.
5. The method according to number 4 wherein the step of generating decoded application bits is done for a plurality of users.

In the preferred embodiments, several kinds of carrier interferometry, coding, filtering, and spatial processing are demonstrated to provide a basic understanding of applications of CI processing. With respect to this understanding, many aspects of this invention may vary. For example, signal spaces and diversity parameters may include redundantly modulated signal spaces. Descriptions of spatial processing may be applied to processing methods for non-spatial diversity parameters. Descriptions of systems and methods using spatial subspaces may be extended to systems and methods that use non-spatial subspaces.

For illustrative purposes, flowcharts and signal diagrams represent the operation of the invention. It should be understood, however, that the use of flowcharts and diagrams is for illustrative purposes only, and is not limiting. For example, the invention is not limited to the operational embodiment(s) represented by the flowcharts. The invention is not limited to specific signal architectures shown in the drawings. Instead, alternative operational embodiments and signal architectures will be apparent to persons skilled in the relevant art(s) based on the discussion contained herein. Also, the use of flowcharts and diagrams should not be interpreted as limiting the invention to discrete or digital operation. Furthermore, functionality illustrated in flow charts may imply functionality of an apparatus of the invention that is not shown. Similarly, descriptions of any apparatus may be used to define one or more methods of the invention.

In practice, as will be appreciated by persons skilled in the relevant art(s) based on the discussion herein, the invention can be achieved via discrete or continuous operation, or a combination thereof. Furthermore, the flow of control represented by the flowcharts is provided for illustrative purposes only. As will be appreciated by persons skilled in the relevant art(s), other operational control flows are within the scope and spirit of the present invention.

Exemplary structural embodiments for implementing the methods of the invention are also described. It should be understood that the invention is not limited to the particular embodiments described herein. Alternate embodiments (equivalents, extensions, variations, deviations, combinations, etc.) of the methods and structural embodiments of the invention and the related art will be apparent to persons skilled in the relevant arts based on the teachings contained herein. The invention is intended and adapted to include such alternate embodiments. Such equivalents, extensions, variations, deviations, combinations, etc., are within the scope and spirit of the present invention.

Signal processing with respect to sinusoidal oscillating signals are described herein. Those skilled in the art will recognize that other types of periodic oscillating signals that can be used, including, but not limited to, sinusoids, square waves, triangle waves, wavelets, repetitive noise waveforms, pseudo-noise signals, and arbitrary waveforms.

The foregoing discussion describes the preferred embodiments of the present invention. With respect to the disclosure, it should be understood that changes can be made without departing from the essence of the invention. To the extent such changes embody the essence of the present invention, each naturally falls within the breadth of protection encompassed by the disclosure of this patent application. This is particularly true for the present invention because its basic concepts and understandings are fundamental in nature and can be broadly applied.

The invention claimed is:

1. A carrier interferometry (CI) transmitter, comprising:
a CI coder adapted to encode at least one data sequence onto a CI code to produce at least one data-bearing code vector and to adjust subcarrier weights, and
a modulator adapted to modulate the at least one data-bearing code vector onto a plurality of subcarriers,
wherein at least one of the modulator or the CI coder is adapted to scramble CI codes generated by the CI coder.

2. The CI transmitter recited in claim 1 wherein the modulator includes an invertible transform module.

3. The CI transmitter recited in claim 2 wherein the invertible transform module is adapted to perform at least one of a Fourier transform, a chirp Z transform, or a sliding transform.

4. The CI transmitter recited in claim 1, wherein the CI coder is adapted to provide for channel coding.

5. The CI transmitter recited in claim 1, wherein at least one of the modulator and the CI coder is adapted to dynamically allocate subcarriers for at least one communication link.

6. A carrier interferometry (CI) transmitter, comprising:
a CI coder adapted to encode at least one data sequence onto a CI code to produce at least one data-bearing code vector and to adjust subcarrier weights, and
a modulator adapted to modulate the at least one data-bearing code vector onto a plurality of subcarriers,
wherein at least one of the modulator or the CI coder is adapted to provide intentional frequency variations to the subcarriers.

7. A carrier interferometry (CI) transmitter, comprising:
a CI coder adapted to encode at least one data sequence onto a CI code to produce at least one data-bearing code vector and to adjust subcarrier weights, and
a modulator adapted to modulate the at least one data-bearing code vector onto a plurality of subcarriers,
wherein the CI coder is adapted to perform at least one CI coding algorithm configured to non-uniformly spread the at least one data sequence across the plurality of subcarriers.

8. A Carrier Interferometry (CI) receiver, comprising:
a demodulator adapted to demodulate at least one data-bearing CI code vector modulated on a plurality of subcarriers and having at least one data sequence non-uniformly spread across the plurality of subcarriers, and
a CI decoder adapted to decode at least one received data sequence impressed onto the CI code vector and to adjust subcarrier weights.

9. A carrier interferometry (CI) receiver, comprising:
a demodulator adapted to demodulate at least one data-bearing CI code vector modulated on a plurality of subcarriers, and
a CI decoder adapted to decode at least one received data sequence impressed onto the CI code vector and to adjust subcarrier weights,
wherein at least one of the demodulator or the CI decoder is adapted to descramble CI codes.

10. The CI receiver recited in claim 9, wherein the demodulator includes an invertible transform module.

11. The CI receiver recited in claim 10, wherein the invertible transform module is adapted to perform at least one of a Fourier transform, a chirp Z transform, or a sliding transform.

12. The CI receiver recited in claim 9, wherein the CI decoder is adapted to provide for channel decoding.

13. The CI receiver recited in claim 9, wherein at least one of the CI decoder or the demodulator are adapted to perform successive interference cancellation.

14. A carrier interferometry (CI) receiver, comprising:
a demodulator adapted to demodulate at least one data-bearing CI code vector modulated on a plurality of subcarriers, and
a CI decoder adapted to decode at least one received data sequence impressed onto the CI code vector and to adjust subcarrier weights,
wherein at least one of the demodulator or the CI decoder is adapted to compensate at least one signal based on the data-bearing CI code vector on the plurality of subcarriers for subcarrier frequency variations intentionally imparted to one or more of the subcarriers by a transmitter.

* * * * *